April 6, 1937.  O. WITTEL  2,076,189
FILM CLAW
Filed Nov. 29, 1935
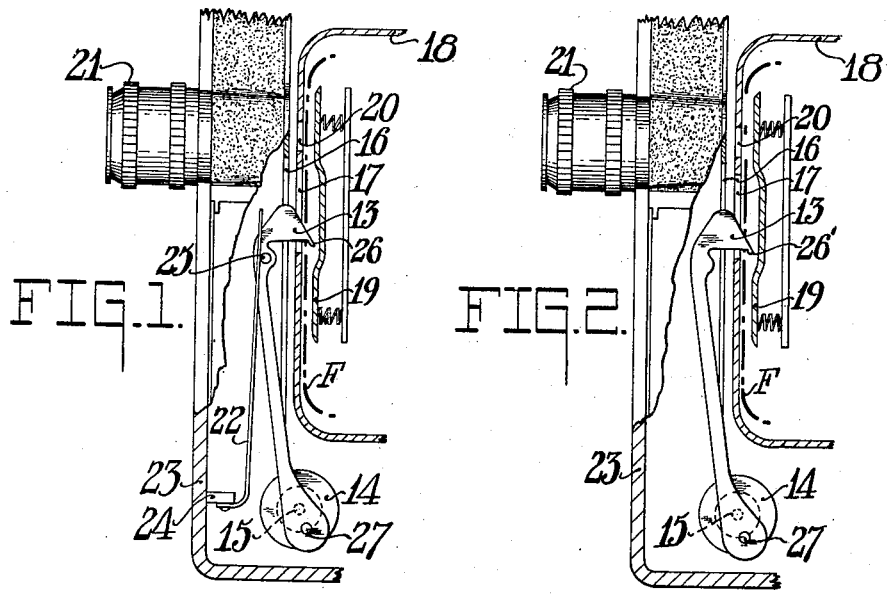
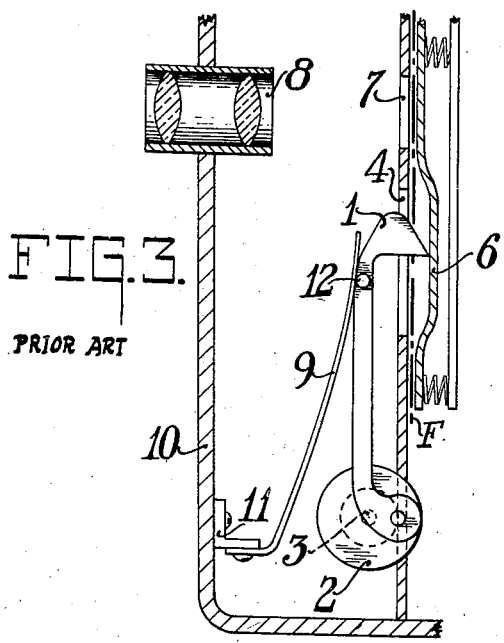
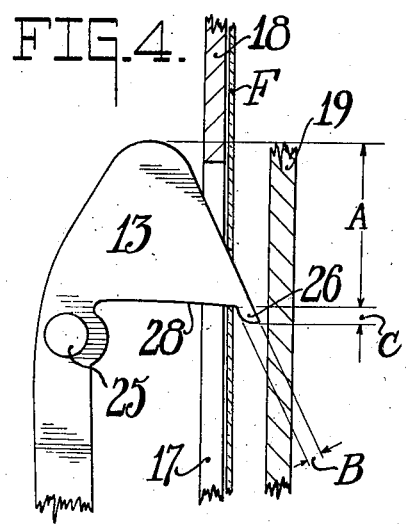
INVENTOR.
Otto Wittel,
BY
ATTORNEYS.

Patented Apr. 6, 1937

2,076,189

UNITED STATES PATENT OFFICE 2,076,189

FILM CLAW

Otto Wittel, Rochester, N. Y., assignor, by mesne assignments, to Eastman Kodak Company, Jersey City, N. J., a corporation of New Jersey Application November 29, 1935, Serial No. 52,005

5 Claims. (Cl. 88—18.4)

This application is a continuation-in-part of patent application Serial No. 758,947, filed December 24, 1934, which was entitled "Film claw," and of which Otto Wittel is the inventor.

This invention relates to photography and more particularly to the film claw in a ratchet type pull-down mechanism for intermittently moving a cinematographic film strip.

To those skilled in the art it is a well known fact that with intermittent pulldown mechanisms of the ratchet type a certain amount of difficulty arises in maintaining the film claw in the film perforations throughout the length of each film advancing stroke of said claw, and in order to get satisfactory results in mechanisms using this form of film advancing means it is absolutely essential that the claw be maintained in the film perforations until the advancing stroke is completed. Up to the present time much difficulty has been encountered in film advancing means of the ratchet type due to the tendency of the claw to hop out of the film perforations before the advancing stroke is completed.

In a movement of this kind when the claw slips out of the engaged perforation before the end of the film advancing stroke it subsequently causes a misframing of the next picture with relation to the lens system, and at the same time the lower take-up loop in the film path is shortened by an amount equal to the length of the film advancing stroke not completed. It is obvious therefore, that a few repetitions of these incompleted strokes finally cause the loss of the lower take-up loop in the film path thereby necessitating a shut-down, because the take-up means then pulls the film through the film gate in a continuous manner.

Of the several different means previously used to insure the engagement of the claw and the film perforations, probably the spring pressing means which constantly acts against the claw to press it against the film, and the use of a claw having a sharply inclined film engaging face wherein the nose of the claw during engagement with the film perforations is below the engaged edge of the perforation, are most common.

The spring pressing method mentioned above works satisfactorily as long as the exact tension required can be incorporated in the spring, but if the tension becomes too loose the spring is useless, while if the tension is too great it tends to cause an unsteadiness in the film movement due to the fact that the claw tends to reverse the film strip momentarily on its upstroke instead of leaving the perforation cleanly. If the spring tension in the film gate is tightened to overcome this latter difficulty then the pull on the film by the take-up means is usually increased to a point where the driving motor is overloaded.

The use of a film claw which has a sharply inclined film engaging face, wherein the tip of said claw is below the engaged edge of the film perforation during the advancing stroke, also presents several difficulties. In the first place, in order to insure steadiness in the picture frame of the film strip it is absolutely essential that the film claw advance the film strip an equal amount during each advancing stroke thereof, and this requirement necessitates the claw leaving the successive film perforations at identical points relative to the lens system. In a pull-down mechanism of the ratchet type it is almost impossible to control the distance to which the claw penetrates the film perforations and insure that on each stroke of the claw the depth of penetration is exactly the same, particularly at the end of the advancing stroke. Therefore, if a claw having a sharply inclined film engaging face is used, any variation in the depth of penetration of said claw into the film perforations between the successive advancing strokes thereof will cause a variation in the length of film advanced at each stroke because the claw will fail to leave each successive engaged perforation at the same point relative to the lens system. Although this variation may seem negligible, an unsteadiness in the picture frame will occur.

In order to insure that the claw leaves the engaged film perforation at exactly the same point regardless of any variation in the penetration of said claw into the engaged film perforation, a straight or substantially horizontal film engaging surface on the claw is required, and the film engaging face of the claw must be horizontal at the end of the advancing stroke. Although a claw having a substantially horizontal film engaging face is preferable, this type of claw is most susceptible to the above mentioned disadvantage, that of hopping out of the film perforation during the advancing stroke thereof. This undesirable occurrence is most prevalent at the point where the claw is half way through its advancing stroke, because at this point the film engaging face of the claw is at an angle with relation to the engaged edge of the film perforation so that its natural tendency is to slide out of the film perforation. This angular change of the film engaging face of the claw with respect to the engaged edge of the film perforation is due to the eccentric mounting of said claw. My invention is designed to overcome the above mentioned difficulties and at the same time insure the engagement of the film claw in the film perforation throughout the film advancing stroke of said claw.

Therefore, one object of this invention is to provide an improved film claw for a ratchet type pull-down mechanism which insures an exact advancing of the film strip regardless of the depth to which the claw penetrates the film perforation at the end of its successive advancing strokes.

Another object is to provide a film claw whose form positively insures the engagement of claw and the film perforation throughout the advancing stroke of said claw.

Still another object is to provide a claw whose construction permits the elimination of the means commonly used for constantly forcing the claw toward the film strip.

Other objects will appear hereinafter from the following specification, the novel features being pointed out in the claims at the end thereof.

Briefly, my invention consists of a film claw having a protuberance on its tip which projects vertically below a substantially horizontal film engaging face on the claw, and which extends below the edge of the film perforation engaged by the claw to act as a hook, if the claw tends to leave the film perforation, for positively holding said claw in the film perforation until the film advancing stroke is completed. Any of the spring pressing means as commonly used with pull-downs of this type for pressing the claw towards the film may be used in connection with this new type claw, but no definite limits as to the tension inherent in said spring pressing means is important except that it shall not be too strong to prevent the claw from leaving the perforation cleanly prior to its upstroke. The omission of any type spring pressing means is possible with this type claw, it being possible to obtain the result thereof by the combination of the inherent friction in the bearing of the claw and its reciprocating means which tends to give a constant frictional force which acts on the claw in the direction of the reciprocating means which would be toward the film under normal operating conditions.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which, Fig. 1 is an enlarged fragmentary side elevation of a camera, partly in section, showing the pull-down mechanism with my novel claw spring pressed against the film; the engaging portion of the claw being exaggerated for the sake of clearness, Fig. 2 is the same as Fig. 1 with the spring pressing means for the claw omitted, and a modified proturberance being shown on the claw, Fig. 3 is a fragmentary section of a camera showing the pull down mechanism in elevation with one type of claw found in the prior art, and Fig. 4 is a greatly enlarged elevation of the claw in film engaging position at the start of its advancing stroke.

Like characters and references refer to corresponding parts of Figures 1, 2 and 4.

In Fig. 3 a ratchet type pull down mechanism of the prior art is shown for the purpose of comparison with my proposed structure. In this figure a film claw 1 is shown eccentrically pivoted to the disc 2 said disc being rotated by the drive shaft 3. As the shaft 3 is rotated, the film claw 1 is reciprocated vertically through a slot in the partition 4 to engage the perforations of the film strip F at the top of its stroke and advance said film strip an amount equal to its downward stroke. Any type of spring pressed gate 6 may be used to guide the film past the aperture 7 in the partition 4 which is in axial alignment with the objective 8, and to hold the film against the partition so that the claw can engage it properly throughout each advancing stroke thereof.

The disc 2 is situated to one side of the plane of the film F in the gate 6 so that the undesirable tilting of head of the claw 1 at the half way point of the advancing stroke due to its eccentric mounting described above, will be eliminated, and the straight edge of the claw 1 will engage the film substantially at right angles as shown. However, this offset position of the disc 2 with respect to the plane of the film presents another difficulty in that with a claw having a straight film engaging face as shown, at the bottom of the film advancing stroke, the film engaging face of the claw will be tipped inward with respect to the plane of the film and any variation in the penetration of the claw and the film perforations at this point in successive strokes of the claw will necessarily cause a variable film advancement which is very undesirable.

The claw is constantly forced toward the film by means of a spring 9 which is suitably mounted on the camera wall 10 by means of a bracket 11, said spring acting on said claw 1 through a pin 12 which extends therethrough. This spring pressing means 9 serves two purposes. First, it acts to constantly force the claw toward the film so that it will properly engage the film perforations at the top of its stroke; and secondly, it acts to hold said claw 1 in engagement with an engaged film perforation throughout the downward stroke thereof to prevent it from accidentally hopping out thereof before the film advancing stroke is completed. The tension in this spring 9 has to be controlled very closely between two well defined limits. If it is too weak, it fails to hold the claw in the perforation throughout the film advancing stroke, and if it is too strong it tends to force the claw into each engaged film perforation so tightly that the claw cannot leave the perforation cleanly for the upstroke without tending to momentarily reverse the film strip.

This type of claw shown in Fig. 3 and taken from the prior art can be made to work satisfactorily in cameras using slow or normal speeds, but in high speed work this type of claw is very unsatisfactory primarily due to the more stringent requirements regarding the tension in the spring 9, and the greater variation in the penetration of the claw into the engaged film perforation at the end of the advancing stroke of the claw.

Referring to Fig. 1, a film claw 13 of my proposed form is included in a ratchet type pull-down mechanism and is eccentrically pivoted to a disc 14, said disc being driven by a drive shaft 15. When the shaft 15 is rotated the film claw 13 is reciprocated vertically, acting through a slotted plate 16 to engage the perforations of a film strip F through an aperture 17 in the magazine 18 so that the film is engaged at the top of its stroke and advanced an amount equal to the downward stroke of the claw. A spring pressed gate 19 is used to guide the film past the aperture 20 in the magazine which is in axial alignment with the objective 21, and to hold the film against the front of the magazine so that the claw can engage it properly at each stroke.

In my structure the disc 14 is mounted in the plane of the film F at the gate of the camera so that when the claw 13 is at the bottom of its downward stroke, its point of mounting on the disc 14 will be in the plane of the film F at the gate. By mounting the disc 14 directly under the film strip as described the ideal condition is attained wherein downward pull on the film engaging face of the claw 13 at the end of the advancing stroke is directly downward instead of being at an angle as would be the case of an offset mounting as shown by the prior art in Fig. 3.

In order to attain the ideal condition wherein the film strip F is advanced an equal amount at each downward stroke of the claw 13 regardless of the depth of penetration of said claw into the engaged film perforation at the end of its downward stroke, the film engaging face 28, Fig. 4, of said claw takes the form of an arc about a center located by the center of the driving shaft 15. This engaging face 28 is substantially horizontal in all positions of the claw 13, but is given a slight arcuate shape to allow for the slight tilting action to which the claw is necessarily subjected on its advancing stroke due to its eccentric mounting on the disc 14. The arcuate face is also provided to account for any variation in the depth of penetration of said claw with the engaged film perforation, so that regardless to what extent the claw penetrates a film perforation at the end of the advancing stroke it will leave said perforation at identically the same point, relative to the lens system, as it would any successive film perforation.

In Fig. 2 I have shown the engaging face of the claw modified to one having a straight face. It has been found by calculation that if the engaging face of the claw is straight and has approximately 6° angle with a horizontal through the tip of the claw it will function almost identically with a claw having an arcuate film engaging face as described above. The angle of a face of this type would necessarily vary with the dimensions of the several parts going to make up the pull-down mechanism so that the scope of my invention should not be limited thereby.

Referring back to Fig. 1, a spring 22 is fastened to the camera frame 23 by a bracket 24, said spring constantly acting against the pin 25 through the claw 13 to force said claw 13 toward the film so that it will engage the film perforations at the beginning of its downward stroke, and to help hold said claw in the engaged perforation until the downward stroke has been completed. In order to positively insure the engagement of the claw 13 with the film perforation throughout the advancing stroke of said claw, I provide the tip of said claw with a suitable protuberance 26, Figs. 1 and 4, which projects below the engaged edge of the film perforation when the claw is in engagement with the film. This protuberance 26 acts as an abutting surface for the film when the claw tends to leave the perforations before the completion of the downward stroke this tendency being most prevalent in the position wherein the claw is half way through its advancing stroke as described in connection with the prior art above.

Figures 1 and 4 show this protuberance 26 in the preferred form, the tip of the protuberance being in the form of a quarter circle while its sides are parallel to each other and forming an obtuse angle with the film engaging face of the claw. In Fig. 2 a protuberance 26' of modified form is shown, the top of the protuberance being semi-circular while is sides are substantially perpendicular to the film engaging face of the claw. In Fig. 3, a claw 1 of the prior art is shown having a straight film engaging surface, this type of claw relying solely on its spring pressing means 9, of definite tension, for holding it in engagement with the film perforation throughout the film advancing stroke of the claw.

In the type of pull-down mechanism shown in Figs. 1 and 2 embodying my proposed type of claw, the tension in the spring pressing means 22 does not have to be controlled between any well defined limits as is necessary with the similar spring pressing means 9 described in connection with the prior art, because my proposed claw 13 is positively held in the engaged film perforation by means of the protuberance 26 instead of by means of the spring 9 as found in the prior art. Since the claw 13 is positively held in engagement with the film perforations by virtue of the protuberance 26 or 26', Figs. 1 and 2, the use of a strong spring pressing means which is necessary for this purpose in claws of the prior art, as described, is eliminated, and the ensuing disadvantage of this strong spring pressing means, tending to cause a momentary reversal of the film as the claw starts its upstroke, is also eliminated. Therefore, it is readily understandable that a claw of the type proposed is more satisfactory than that shown in connection with the prior art especially for high speed work where the danger of the claw hopping out of the engaged perforations is much more prevalent than at ordinary speeds of operation. Also, in the use of a claw 1, as found in the prior art, whose engagement with the film perforation during the advancing stroke depends upon a strong spring pressing means 9, it has been described how closely the tension of this spring 9 must be controlled to allow the claw 1 to satisfactorily leave the perforation at the start of its upstroke without causing a momentary reversal of the film; and for this reason a claw of this type cannot be designed to work alternately at ordinary speeds and high speeds as is possible with a claw 13 having a protuberance 26 as proposed.

As shown in Fig. 2 it is possible with this new type of claw to eliminate the spring pressing means 22, as commonly used for holding the claw 13 against the film strip, by using the inherent friction in the bearing 27 of the film claw and the rotating disc 14 which gives a constant frictional force acting on the claw 13 in the directions of rotation of the disc 14 sufficient to hold the claw 13 in contact with the film strip at all times, and thereby position it so that it will enter the film perforation at the beginning of the film advancing stroke. After the claw 13 has entered the film perforation for the advancing stroke its engagement with the film perforation is insured throughout the stroke by the combined action of the protuberance 26' on the tip of the claw and the frictional force emanating from the bearing 27 which constantly forces the claw 13 toward the film strip. This frictional force which is inherent in the bearing 27, and which always acts on the claw 13, is also present in the form of mechanism shown in Fig. 1 in which case it tends to lighten the tension required of the spring 22. In the case where the spring is entirely omitted and the friction in the bearing 27 is relied on for forcing the claw 13 against the film, as shown in Fig. 2, it is desirable to increase the friction in this bearing 27 over that which would be required in the form shown in Fig. 1.

In this proposed type of pull-down mechanism the top of the film claw is constantly held in contact with the film F either through the action of a spring 22, the frictional force in the bearing 27, or both. At the top of its stroke the claw tip 26 or 26' stops its upstroke about .02" above the film perforation to be engaged, and as the claw starts downward, this tip being forced constantly against the film F, automatically enters the required film perforation; and since the engagement of the claw is insured throughout the film advancing stroke of the claw by virtue of the protuberance 26 or 26' on the claw tip, which grips the perforation in a hooklike fashion, the film is pulled down an amount equal to the downward stroke of the claw 13. Inasmuch as one of the most essential requirements of a pull-down mechanism of this type is that the claw 13 leaves the successive film perforations at identically the same point relative to the lens system, and that a variation of penetration of the claw into said film perforation at the end of the stroke would effect this requirement, I have altered the film engaging face of the claw 13 as described above to account for any variation in this penetration so that the claw will have each successive perforation at the same point relative to the lens system.

The top of the claw is cut away at such an angle that as the downward stroke is completed and the upward stroke is started the claw tip leaves the film perforation cleanly so that no unsteadiness is caused by the tendency of the claw to reverse the film momentarily as it starts its upstroke. After the claw leaves the film perforation for its upstroke it rides against the film throughout this stroke due to the action of suitable means described above so that when the top of the stroke is reached the claw tip is in position to engage the next film perforation and repeat its operation.

Fig. 4 shows the preferred form of the claw 13 greatly enlarged for the purpose of clearness. As shown the claw is in engaging position with the film strip F at the start of the advancing stroke and it should be noticed that the face 22 thereof engages the bottom of the perforation substantially parallel to the edge of said perforation. The form of the protuberance 26, shown in Fig. 4 differs from the protuberance 26' shown in Fig. 2 by having the upper side of the claw ground down to cut the ball tip 26' substantially through its center thereby giving the upper side of the claw a continuous straight line surface from its top to the tip of the protuberance. This construction gives the upper side of the claw a steeper angle and lessens the liability of the claw attempting to reverse the film strip on its upstroke. Also in this form of the film claw, the inside or film engaging face of the protuberance 26 is made parallel to the upper face of the claw instead of substantially vertical as shown on the protuberance 26' in Fig. 2. By way of showing the actual size of these protuberances 26 and 26' with relation to the claw 13, and to emphasize the minuteness of their size, the following dimensions are given. In Fig. 4, the dimension A=.1225", B=.0025", and, C=.005". These dimensions are merely given as illustrative of the size of the protuberance with relation to the claw, and should in no way limit the scope of the invention.

My proposed film claw presents several advantages over those commonly used. First, it allows the use of a claw in which the film engaging face is substantially horizontal so that the advance of the film strip is not altered by any variation in the depth to which the claw penetrates the film perforations as compared with a film claw having a sharply inclined film engaging surface. Secondly, the engagement of this claw with a film perforation is not dependent upon any special spring pressing means, the tension in which has to be confined within certain well defined limits; in fact the spring pressing means can be entirely omitted without impairing the operation of the apparatus. And last but not least, it provides for the use of a claw having a film engaging face which is substantially parallel to the engaged edge of the film perforations throughout the advancing stroke thereof so that the stress introduced on said engaged edge is distributed across the entire thickness of the film at the perforation instead of being localized on one corner thereof as would be the case if a claw having a sharply inclined film engaging face were used.

Although I have shown and described certain specific embodiments of my invention, I am fully aware that many modifications thereof are possible. My invention, therefore, is not to be restricted except insofar as is necessitated by the prior art and by the spirit of the appended claims.

What I claim is:

1. In a motion picture apparatus, the combination with a guideway for supporting a film strip which is provided with perforations, and a film advancing means of the ratchet type including a claw member for intermittently engaging successive perforations of said film strip, and including an eccentric member for reciprocating said claw member through a pull-down stroke, of a film engaging surface on said claw member, said film engaging surface being substantially straight and adapted to be parallel to the edge of the engaged perforation and substantially normal to the film path at the end of the pull-down stroke, and a protuberance located at the end of the film engaging surface and extending below the plane of said film engaging surface.

2. In a motion picture apparatus, the combination with a guideway for supporting a film strip which is provided with perforations, and a film advancing means of the ratchet type including a claw member for intermittently engaging successive perforations of said film strip, and including an eccentric member rotatable about an axis within the plane of said film strip in the guideway, and for reciprocating said claw member through a pulldown stroke, of a film engaging surface on said claw member, said film engaging surface being substantially straight and adapted to be parallel to the edge of the engaged perforation and substantially normal to the film path at the end of the pull-down stroke, and a protuberance located at the end of the film engaging surface and extending below the plane of said film engaging surface.

3. In a motion picture apparatus operable at high speeds, the combination with a guideway for supporting a film strip provided with perforations, a ratchet claw member for intermittently engaging successive perforations of said film strip, an eccentric member for reciprocating said claw member through a cycle comprising a pull-down stroke and a return stroke, and a tendency means acting upon said ratchet claw member and adapted to exert a force sufficient to move the same into engagement with one of said perforations at the commencement of said pull-down stroke but insufficient to cause retrograde motion of the film strip during the return stroke of said ratchet claw member particularly upon operation at said high speeds, of a film engaging surface on said claw member, said film engaging surface being substantially straight and adapted to be substantially parallel to the edge of the engaged perforation and substantially normal to the film path at the end of the pull-down stroke, and a protuberance located at the end of the film engaging surface and extending below the plane of said film engaging surface.

4. In a motion picture apparatus operable at high speeds, the combination with a guideway for supporting a film strip provided with perforations, a ratchet claw member for intermittently engaging successive perforations of said film strip, an eccentric member for reciprocating said claw member through a cycle comprising a pull-down stroke and a return stroke and a spring member exerting upon said ratchet claw member a resilient force sufficient to move the same into engagement with one of said perforations at the commencement of said pull-down stroke but insufficient to cause retrograde motion of the film strip during the return stroke of said ratchet claw member particularly upon operation of said high speeds, of a film engaging surface on said claw member, said film engaging surface being substantially straight and adapted to be substantially parallel to the edge of the engaged perforation and substantially normal to the film path at the end of the pull-down stroke, and a protuberance located at the end of the film engaging surface and extending below the plane of said film engaging surface.

5. In a motion picture apparatus, the combination with a guideway for supporting a film strip provided with perforations, a ratchet claw member for intermittently engaging successive perforations of said film strip, an eccentric member for reciprocating said claw member through a cycle comprising a pull-down stroke and a return stroke, and a connection between said claw and eccentric member and having sufficient friction to cause said claw member to move into engagement at the commencement of said pull-down stroke, of a film engaging surface on said claw member, said film engaging surface being substantially straight and adapted to be substantially parallel to the edge of the engaged perforation and substantially normal to the film path at the end of the pull-down stroke, and a protuberance located at the end of the film engaging surface and extending below the plane of said film engaging surface.

OTTO WITTEL.